United States Patent [19]

Shanley, II

[11] 4,291,336

[45] Sep. 22, 1981

[54] COMPOSITE KEYING SIGNAL GENERATOR FOR A TELEVISION RECEIVER

[75] Inventor: Robert L. Shanley, II, Indianapolis, Ind.

[73] Assignee: RCA Corporation, New York, N.Y.

[21] Appl. No.: 113,214

[22] Filed: Jan. 18, 1980

[51] Int. Cl.³ .............................................. H84N 5/44
[52] U.S. Cl. .................................. 358/160; 358/166; 358/21 R; 358/25
[58] Field of Search ................ 358/17, 19, 21R, 21 V, 358/23, 25, 31, 33, 34, 39, 40, 141, 148, 150, 160, 166, 165, 171, 176, 178

[56] References Cited

U.S. PATENT DOCUMENTS 4,173,023 10/1979 Lagoni .................................. 358/20

Primary Examiner—Jin F. Ng
Assistant Examiner—Michael A. Masinick

Attorney, Agent, or Firm—Eugene M. Whitacre; William H. Meagher; Ronald H. Kurdyla

[57] ABSTRACT

A circuit for generating a composite keying signal includes a burst gate circuit, a clipping circuit, and a voltage divider, in a color television receiver also including means for deriving horizontal and vertical blanking signals and a horizontal sync pulse from a composite color television signal containing a color burst component. The burst gate circuit responds to the lagging edge of the horizontal sync pulse to develop a burst gate pulse encompassing the burst interval. The clipping circuit and the voltage divider serve to clip and translate both the horizontal and vertical blanking signals, which are then combined with the burst gate pulse to produce a composite keying signal. The composite keying signal comprises a first pulse component of desired magnitude as determined by the clipping and voltage divider circuits and occurring during the blanking intervals, and a second pulse component as provided from the burst gate circuit, superimposed on the first pulse and encompassing the burst interval.

9 Claims, 9 Drawing Figures

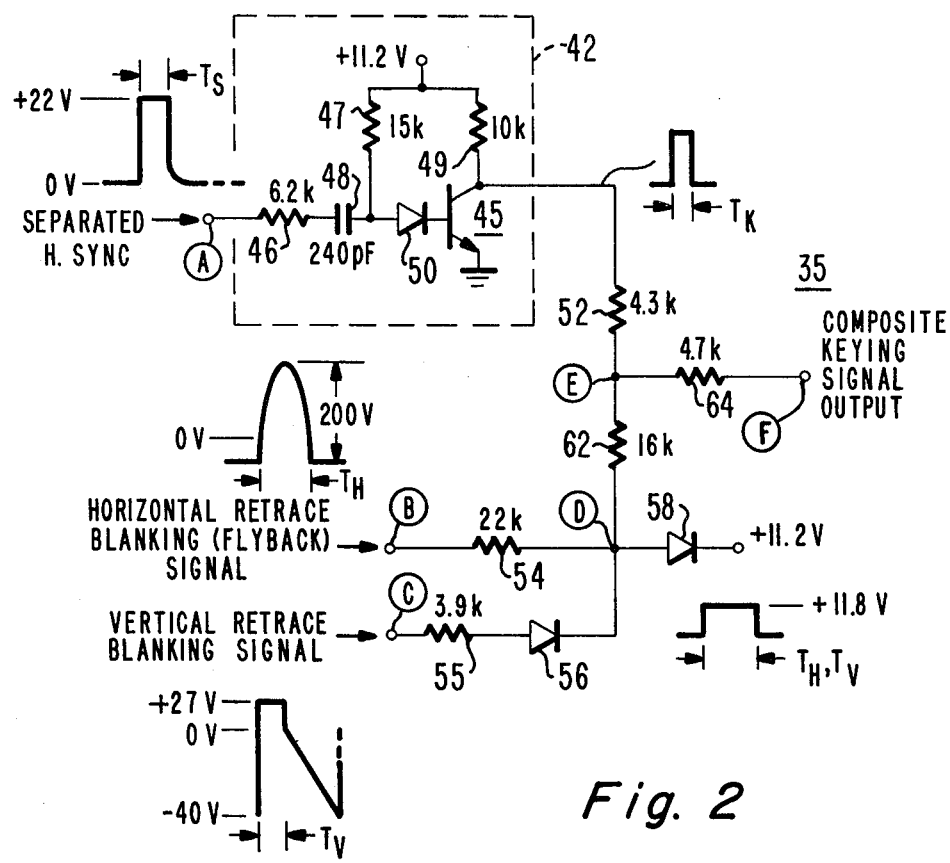
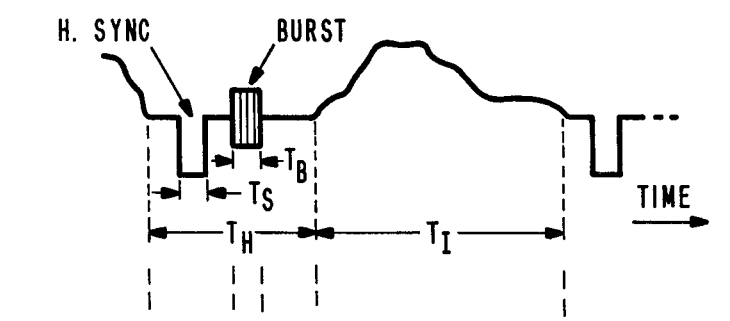
Fig. 3
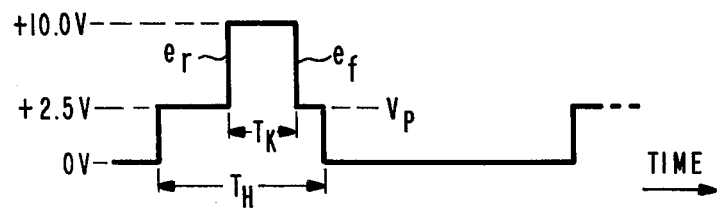
Fig. 4

COMPOSITE KEYING SIGNAL GENERATOR FOR A TELEVISION RECEIVER

This invention concerns a circuit arrangement for developing a single, composite signal from which multiple keying signals can be derived, for use in a television receiver or equivalent video signal processing system including keyed circuits. In particular, the invention concerns such a circuit wherein the composite keying signal is accurately timed and exhibits a reliable keying reference level on a unit-to-unit basis.

In a color television receiver for processing a composite color television signal including luminance, chrominance and synchronizing signal components, there is a requirement for performing signal processing functions that require keying or synchronization with respect to the composite television signal. In pertinent part, these functions include keying to separate the burst and chrominance information components of the composite signal, keying a blanking level clamp during image blanking intervals to establish a black reference level for a displayed picture, and keying during horizontal and vertical retrace blanking intervals to inhibit image display during these intervals.

When keyed luminance or chrominance signal processing circuits of the receiver are contained within an integrated circuit in whole or in significant part, it is desirable to provide a single, composite keying signal from which signals for performing the described keying functions can be derived. A single, composite keying signal of this type is desirable since only a single external keying signal input terminal of the integrated circuit is then required.

Such a composite keying signal is known, and is often referred to as a "sandcastle" signal because of its configuration. The sandcastle keying signal typically comprises a first pulse component of a given width, and a second pulse component of lesser width superimposed on the first pulse component. The first and second pulse components exhibit given amplitudes and timing in accordance with the keying and synchronizing requirements of signal processing circuits within the receiver.

In accordance with the principles of the present invention, there is disclosed herein an uncomplicated, economical circuit arrangement for generating a composite keying signal of the type described above. The circuit is capable of generating accurately timed keying pulse components of the composite signal, particularly with respect to the relatively short burst interval of the color television signal. The circuit is also arranged to exhibit reduced dependency on unit-to-unit circuit tolerance variations and temperature effects, for example, whereby a reliable keying pedestal reference level of the composite signal is established.

An arrangement according to the present invention is included in a color television receiver for processing a composite color television signal containing an image information component occurring during image intervals and an image synchronizing component occurring during image blanking intervals. The synchronizing component includes a horizontal synchronizing component and a succeeding color burst component occurring during horizontal image blanking intervals. The receiver includes a network for providing a periodic horizontal reference pulse representative of the horizontal synchronizing component, a network for deriving horizontal and vertical blanking signals from the synchronizing component, keyed signal processing circuits, and apparatus for generating a composite keying signal comprising a first pulse of desired magnitude substantially coincident with the blanking intervals and a second pulse superimposed on the first pulse and encompassing the burst interval. The keying apparatus comprises a keyed circuit responsive to the horizontal reference pulse for producing a gate pulse encompassing the burst interval, a network for coupling the derived horizontal and vertical blanking signals to a common point, a clipping network, a signal translating network, and a signal combining network. The clipping network is operative in common with respect to the derived horizontal and vertical blanking signals as coupled to the common point, for clipping amplitude excursions of the derived horizontal and vertical blanking signals to a given level. The translating network is operative in common with respect to the clipped horizontal and vertical blanking signals, for translating the clipped signals to produce horizontal and vertical blanking signals of a desired magnitude. The combining circuit combines the burst gate pulse and the translated horizontal and vertical blanking signals to produce the composite keying signal, which is then coupled to the keyed signal processing circuits.

In accordance with a feature of the invention, the keyed circuit includes a transistor coupled to the signal translating network and to a point of reference potential. The transistor serves to provide a reference point for the translating network and thereby assists to establish a desired level of the clipped blanking signals corresponding to the desired magnitude of the first pulse of the composite keying signal.

In the drawing:

FIG. 2 illustrates circuit details of the keying signal generator shown in FIG. 1;

FIGS. 3-8 show signal waveforms useful in understanding the operation of the arrangements shown in FIGS. 1 and 2.

Figure 1:
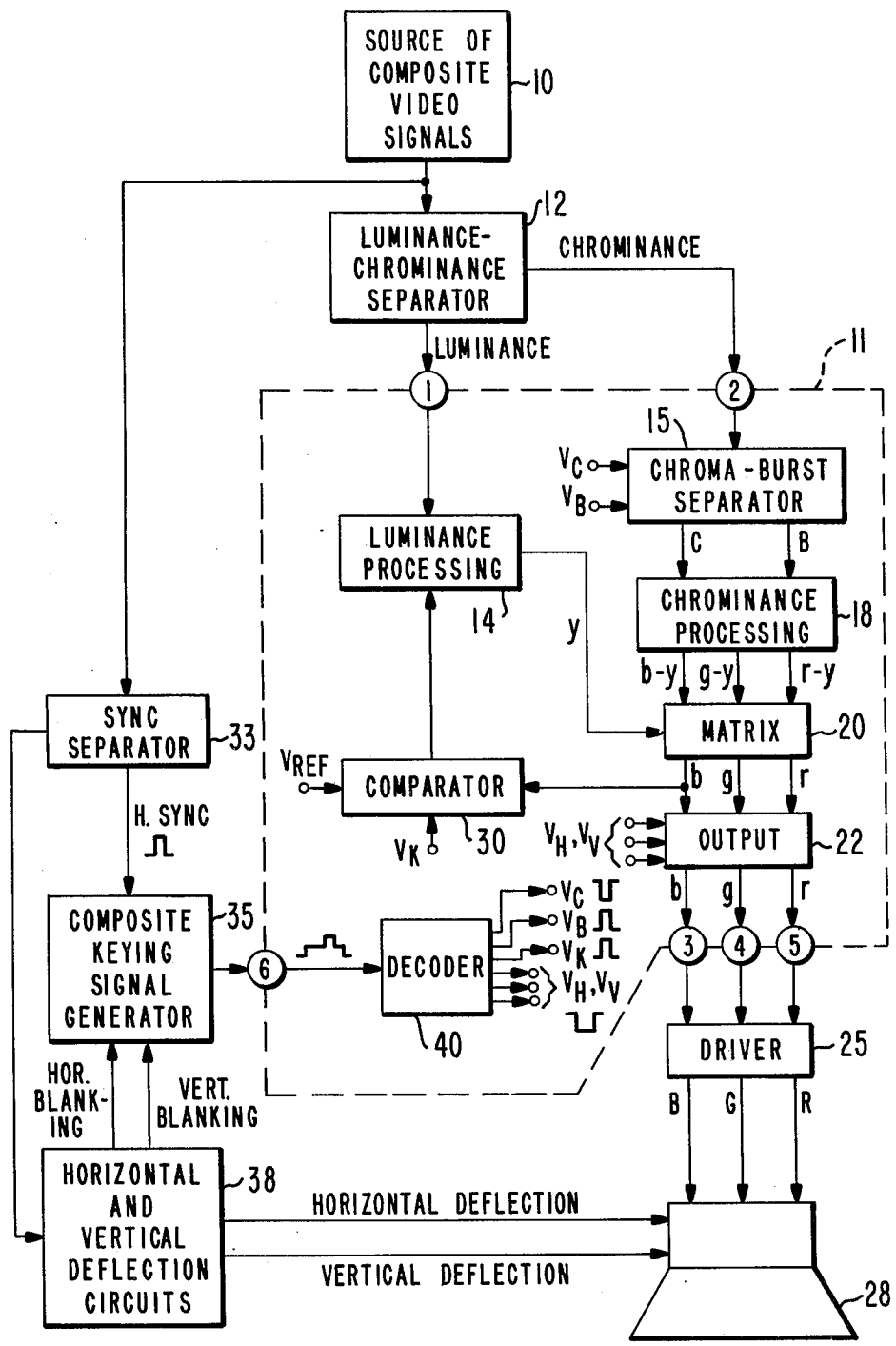
FIG. 1 is a block diagram of a portion of a color television receiver, including a composite keying signal generator according to the present invention.

In FIG. 1, a source of composite color video signals 10 (e.g., including RF and IF amplifier and video detector stages of a color television receiver) supplies signals to a luminance-chrominance signal separator 12. Separator 12 (e.g., a comb filter) separates the luminance and chrominance components of the composite television signal, and supplies these separated components to respective input terminals 1 and 2 of a luminance and chrominance signal processing network 11.

The separated luminance component is processed by a luminance signal processing unit 14 in a luminance channel of the receiver, including signal amplification and peaking stages for example. The separated chrominance component is supplied to a keyed chrominance-burst separator 15, which serves to separate the burst information (B) and chrominance picture interval information (C). Signal separator 15 can be of the type described in U.S. Pat. No. 4,038,681 of L. A. Harwood. The separated signals are then supplied to a chrominance signal processing unit 18 for developing r-y, g-y and b-y color difference signals as known. The color difference signals from unit 18 are combined with an amplified luminance output signal (Y) from unit 14 in a signal matrix 20, for developing output r, b and g color image signals.

The luminance channel also includes a blanking level clamp comprising a keyed comparator 30 which is keyed during the burst interval of each video signal horizontal blanking interval. When keyed, comparator 30 samples and compares a brightness reference voltage $V_{REF}$ with the D.C. level of the signal then appearing at the b (blue) signal output of matrix 20. An output signal from comparator 30 is supplied to a control input of luminance processor 14, for establishing the blanking level of the luminance signal (and thereby picture brightness) at a correct level in accordance with the level of voltage $V_{REF}$. The arrangement of comparator 30 with luminance processor 14 and matrix 20 is described in detail in U.S. Pat. No. 4,195,557 of A. V. Tuma, et al., entitled "Brightness Control Circuit Employing A Closed Control Loop."

The r, g, b color signals from matrix 20 are separately coupled via plural output networks included in an output unit 22, to output terminals 3, 4 and 5 of network 11. The color signals are amplified individually by amplifiers within a kinescope driver stage 25 to provide high level output color signals R, B and G which are then coupled to respective intensity control electrodes (e.g., cathodes) of a color image reproducing kinescope 28.

Video signals from source 10 are also supplied to a sync separator 33, for separating the synchronizing (sync) signal components of the video signal. One output of separator 33 is coupled to horizontal and vertical deflection circuits 38 of the receiver. Circuits 38 supply output horizontal and vertical deflection signals to deflection coils of kinescope 28 to control horizontal and vertical image scanning of the kinescope.

A signal generator 35 develops a periodic composite ("sandcastle") keying signal in response to separated horizontal sync pulses from another output of sync separator 33, and horizontal and vertical retrace blanking signals from deflection circuits 38. A composite keying signal output from generator 35 is supplied via a terminal 6 to a decoder 40, which decodes the composite keying signal into keying pulses $V_B$, $V_C$, $V_K$ and $V_H$, $V_V$ as required by keyed circuits within network 11.

Keying pulses $V_B$ and $V_C$ occur during each burst interval and exhibit a mutually antiphase (push-pull) relationship, and are applied to keying inputs of chromaburst separator 15. Keying pulse $V_K$ is in-phase with and of the same (positive) polarity as pulse $V_B$, and is applied to a keying input of comparator 30. Plural keying pulses $V_H$, $V_V$ occur during each horizontal and vertical image retrace interval, and are applied to respective plural keying inputs of output stage 22.

In the arrangement of FIG. 1, the blocks within network 11 are largely capable of being fabricated as a single integrated circuit. In such case, terminals 1–6 correspond to external connecting terminals of the integrated circuit.

The composite keying signal produced by unit 35 is shown in FIG. 4 for one horizontal image scanning period. FIG. 3 illustrates the configuration of a typical television signal over one horizontal image scanning period, in timed relationship with the keying signal of FIG. 4.

The waveform of FIG. 3 comprises a picture information (trace) image interval $T_I$ (approximately 52.4 microseconds) and a periodic horizontal image blanking (retrace) interval $T_H$ (approximately 11.1 microseconds) disposed between each picture interval. The horizontal blanking interval includes a periodic sync interval $T_S$ (approximately 4.76 microseconds) during which the horizontal sync pulse occurs, and a following burst interval $T_B$ containing the burst component (approximately 10 cycles of unmodulated signal at the chrominance subcarrier frequency of approximately 3.58 MHz according to United States television standards).

In the case of a composite keying signal generated during the horizontal blanking interval, the composite keying signal as shown in FIG. 4 includes a first (lower) pulse component with a width or duration corresponding to horizontal blanking interval $T_H$, and a second (upper) pulse component disposed on a pedestal level $V_P$ and occurring over a time interval $T_K$. The latter time interval encompasses burst interval $T_B$. A rising edge $e_r$ of the second pulse component occurs between the end of sync interval $T_S$ and the beginning of burst interval $T_B$. A falling edge $e_f$ of the second pulse component occurs between the end of burst interval $T_B$ and the beginning of image interval $T_I$.

It is important that variations of the magnitude of keying pedestal level $V_P$ be kept to an acceptable minimum on a unit-to-unit basis, so that reliable keying can be achieved. Specifically, keying pedestal level $V_P$ should be within prescribed limits for the purpose of achieving proper blanking, clamping and burst separation keying functions. An incorrect pedestal level $V_P$ can cause the horizontal and vertical blanking functions to be performed improperly or not at all, and similarly can cause burst gate circuits (within unit 15 in FIG. 1) and comparator 30 (FIG. 1) to be activated improperly. It is also desirable for the rising edge ($e_r$) of the second pulse component of the composite signal to be timed to occur between the end of sync interval $T_S$ and the beginning of burst interval $T_B$, and for falling edge $e_f$ of the second pulse component to be timed as discussed above. In the absence of such timing, burst separator 15 in particular is likely to be keyed improperly, whereby burst information can be lost or distorted by interfering signal information.

Figure 5:
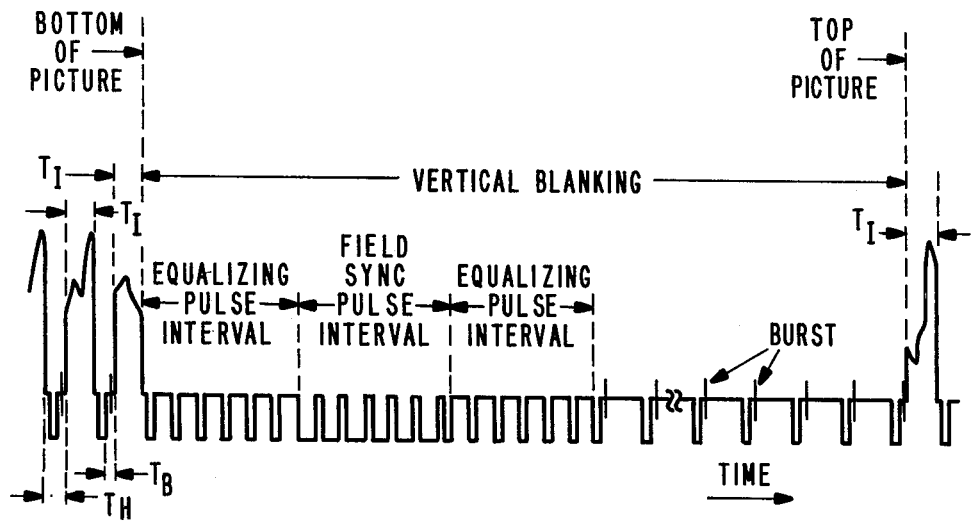
Figure 6:
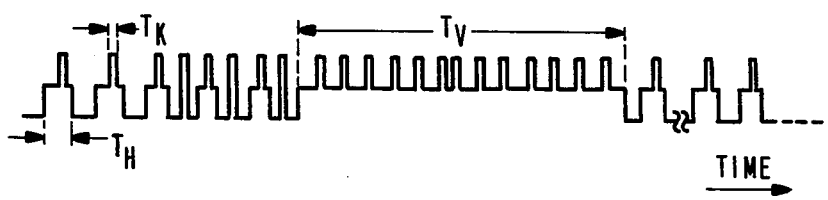
Figure 7:
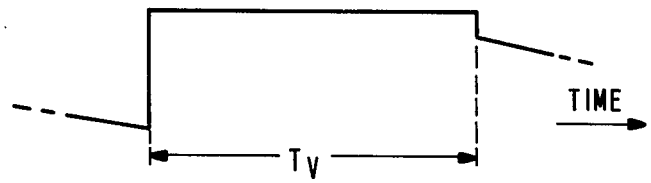
Figure 8:
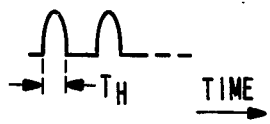

In FIG. 5, there is shown a more detailed composite video signal waveform of one or more horizontal image scanning intervals at the top and bottom of a displayed picture, separated by a vertical image blanking interval (approximately 1335 microseconds) during which picture information is absent. FIG. 6 shows a composite keying signal produced by unit 35 (FIG. 1) for both horizontal and vertical blanking intervals, with respect to the video signal waveform of FIG. 5. FIG. 7 depicts a vertical retrace signal of duration $T_V$ (approximately 500 microseconds) which occurs within each vertical blanking interval, as developed by deflection circuits 38 (FIG. 1). Horizontal retrace blanking (flyback) pulses as also developed by circuits 38 in FIG. 1 are shown by FIG. 8.

Referring now to FIG. 2, there is shown a circuit arrangement of composite keying signal generator 35.

A separated, positive horizontal sync pulse from sync separator 33 is supplied to an input terminal A of a network 42. Network 42 comprises a burst gate pulse generator of the type disclosed in U.S. Pat. No. 4,173,023 of W. A. Lagoni, et al. Network 42 is arranged as a monostable multivibrator (i.e., a "one-shot" multivibrator) and includes a common-emitter transistor 45.

A resistor 49 represents a collector load impedance for transistor 45 together with the effective impedance presented to the collector output of transistor 45 by following circuits to which the collector output of transistor 45 is coupled. A resistor 47 provides base bias for transistor 45. The horizontal sync pulse is supplied to the base input of transistor 45 via a signal differentiating network comprising resistors 46, 47 and a capacitor 48. The timing and duration of a burst gate pulse produced at the collector output of transistor 45 are primarily determined by the coaction of resistors 46, 47 and capacitor 48. A protection diode 50 serves to prevent excessive negative-going voltages, such as may be produced when transistor 45 is keyed during the sync interval, from damaging the base-emitter junction of transistor 45.

Under quiescent conditions (i.e., before the sync pulse appears), transistor 45 is biased to conduct heavily in a saturated state. At this time the collector output potential of transistor 45 closely approaches the emitter potential (i.e., ground potential). The positive-going rising amplitude edge of the sync pulse as coupled via differentiator 46, 47, 48 is in a direction to cause transistor 45 to conduct. However, since transistor 45 is saturated at this time, the positive-going amplitude portion of the sync pulse has substantially no effect on the conduction of transistor 45.

The negative-going falling amplitude edge transition of the sync pulses causes transistor 45 to come out of saturation for a time primarily determined by a time constant associated with resistors 46, 47 and capacitor 48. Transistor 45 turns off in response to this negative transition, causing the collector output voltage to rise quickly in a positive direction after the sync interval ends.

The collector voltage of transistor 45 remains at a positive level until a later time, when transistor 45 returns to the saturated state. The saturated state is again reached when capacitor 48 charges to a positive level, via resistors 46 and 47, sufficient to forward bias the base-emitter junction of transistor 45. Transistor 45 then conducts heavily, whereby the collector output voltage then rapidly decreases to the quiescent level of approximately ground potential.

The duration, or width, of the output burst gate pulse produced when transistor 45 is cut-off is proportional to a time constant defined by the product of the value of capacitor 48 and the sum of the values of resistors 46 and 47. In this manner, the burst gate pulse produced at the collector of transistor 45 corresponds to an appropriately delayed sync pulse which appropriately encompasses the burst interval. In particular, it is noted that the burst gate pulse from transistor 45 is accurately timed to begin after the horizontal sync pulse interval and to end before the image interval, due to the manner in which transistor 45 operates between well-defined saturated and cut-off states. The falling edge of the burst gate pulse, at the end of burst gate interval $T_K$, is produced by transistor 45 going into saturation. This edge therefore exhibits a well-defined and rapid decay time such that exponential decay of long duration is minimized. Accordingly, the likelihood of gating image information occurring after the burst gate interval is minimized. Also, the amplitude of the burst gate pulse is well-defined and predictable since transistor 45 conducts between saturation and cut-off. Additional details concerning the operation of network 42 are found in the aforementioned U.S. patent of W. A. Lagoni, et al.

Horizontal retrace blanking (flyback) signals are applied to an input terminal B and are coupled to a circuit point D via a resistor 54. Vertical retrace blanking signals are applied to an input terminal C and are coupled to circuit point D via a resistor 55 and a diode 56. A signal clipping network comprising a diode 58 coupled between point D and a source of D.C. voltage (+11.2 volts) serves to clip positive amplitude excursions of the horizontal and vertical blanking signals to a fixed positive level (+11.8 volts) at point D.

A voltage divider network comprising resistors 52 and 62 is coupled between circuit point D and a reference potential. In this example, the reference potential is derived from the collector potential of transistor 45 when transistor 45 exhibits a saturated conductive state. At this time, the collector potential of transistor 45 closely approaches the emitter potential of transistor 45, or ground reference potential. Reference is made to the composite keying signal waveform of FIG. 4 in connection with the following discussion of circuit 35 in FIG. 2.

Pedestal level $V_P$ (+2.5 volts) is formed in response to the horizontal blanking signal applied to terminal B. This signal is clipped by the network comprising diode 58 to form a pulse having a positive peak level of +11.8 volts at point D. At this time transistor 45 is saturated, whereby the collector of transistor 45 closely approaches ground potential and provides a reference potential for voltage divider 52, 62. This voltage divider then produces a positive peak pulse level $V_P$ of +2.5 volts at point E, according to the expression $$V_P = 11.8 \text{ volts} \times \left( \frac{R_{52}}{R_{52} + R_{62}} \right)$$

where $R_{52}$ and $R_{62}$ correspond to the values of resistors 52 and 62, respectively. The second, upper pulse component of the composite keying signal, which occurs during intermediate interval $T_K$, corresponds to the burst gate output pulse from transistor 45 as discussed. This pulse component is coupled to combining point E via resistor 52. The composite keying signal developed at point E is coupled via a resistor 64 to output terminal F of circuit 35.

Although the operation of circuit 35 has been described with regard to a composite keying signal developed during the horizontal blanking interval (FIGS. 4 and 6), the circuit operates in similar fashion to produce a composite keying signal during vertical blanking intervals (FIG. 6).

It is noted that the described arrangement utilizes a common clipping network (comprising diode 58) and a common voltage divider network (comprising resistors 52, 62) for the purpose of providing pedestal keying level $V_P$ in response to the horizontal and vertical retrace blanking signals. The use of single, common clipping and voltage divider networks in this fashion enhances the reliability of pedestal keying level $V_P$ by reducing to a minimum the amount of signal translating networks required to establish the desired level of keying pedestal $V_P$. This results in a cost effective circuit which reduces the effects of circuit tolerance variations and temperature effects to an acceptable minimum.

It is also noted that a significant advantage is provided by the manner in which voltage divider 52, 62 is provided with a reference potential via the collector-emitter path of transistor 45. The collector potential of transistor 45 provides a good, stable reference potential for voltage divider 52, 62, since transistor 45 is saturated at all times except during keying interval $T_K$. During this interval, the potential applied to resistor 52 from the collector of transistor 45 (approximately +11.2 volts) substantially equals the potential applied to resistor 62 from point D (+11.8 volts) due to the clipping action of diode 58 during the blanking interval which includes interval $T_K$. Therefore, transistor 45 is not required to supply any significant additional amount of current drive to resistors 52 and 62 during interval $T_K$.

With a different voltage divider arrangement (e.g., if the collector output of transistor 45 were directly connected via an additional resistor to point E, and if the end of resistor 52 shown connected to the collector of transistor 45 were instead connected directly to ground) additional current drive to the voltage divider would be required. Transistor 45 would then undesirably need additional current drive (power) capability. Alternatively, an additional low output impedance follower transistor coupled from the collector output of transistor 45, or an additional appropriate resistive voltage divider, would be needed to provide sufficient current drive to the voltage divider (52, 62).

Figure 9:
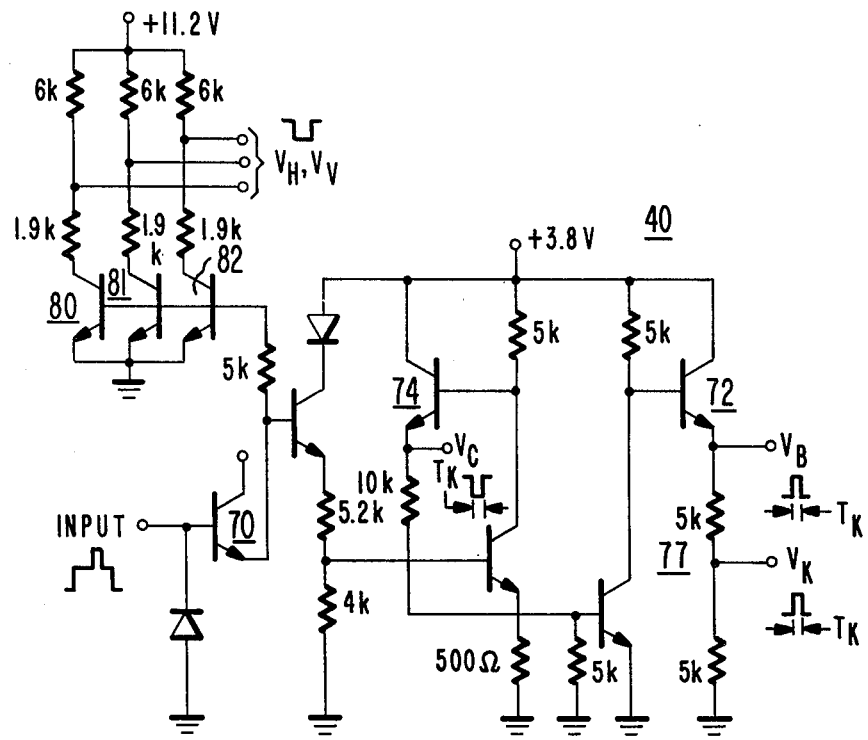
FIG. 9 shows circuit details of a signal decoder circuit for decoding signals produced by the keying signal generator shown in FIGS. 1 and 2.

FIG. 9 illustrates a circuit arrangement of decoder 40 (FIG. 1), for decoding the composite keying signal output from generator 35 into appropriate separate keying pulses.

The composite keying signal is applied to a transistor 70. Complementary phase keying signals $V_B$ and $V_C$ for use by burst separator 15 (FIG. 1) appear at emitter outputs of transistors 72 and 74, respectively. Comparator keying signal $V_K$ is derived from a point in a voltage divider 77 in the emitter circuit of transistor 72. Plural horizontal and vertical blanking pulses $V_H$, $V_V$ are derived from respective voltage divider networks in collector output circuits of transistors 80, 81 and 82.

What is claimed is:

1. In a color television receiver for processing a composite color television signal containing an image information component occurring during image intervals and an image synchronizing component occurring during image blanking intervals, said synchronizing component including a horizontal synchronizing component and a succeeding color burst component occurring during horizontal image blanking intervals; said receiver including means for providing a periodic horizontal reference pulse representative of said horizontal synchronizing component; means for deriving horizontal and vertical blanking signals from said synchronizing component; keyed signal processing circuits; and apparatus for generating a composite keying signal comprising a first pulse of desired magnitude substantially coincident with said blanking interval and a second pulse superimposed on said first pulse and encompassing the burst component interval, said apparatus comprising:

keyed means responsive to said horizontal reference pulse for producing a gate pulse encompassing said burst interval;
means for coupling said derived horizontal and vertical blanking signals to a common point;
means, operative in common with respect to said derived horizontal and vertical blanking signals, coupled to said common point for clipping amplitude excursions of said derived horizontal and vertical blanking signals to a given level;
means, operative in common with respect to said clipped horizontal and vertical blanking signals, for translating said clipped horizontal and vertical blanking signals to produce horizontal and vertical blanking signals of a desired magnitude;
means for combining said burst gate pulse and said translated horizontal and vertical blanking signals to produce said composite keying signal; and
means for coupling said composite keying signal to said keyed signal processing circuits.

2. Apparatus according to claim 1, wherein said keyed means comprises:
an active device with an input for receiving said horizontal reference pulse, and an output from which said gate pulse is provided; and
means for biasing said active device to exhibit one conductive state under quiescent conditions and another conductive state in response to said horizontal reference pulse.

3. Apparatus according to claim 2, wherein:
said active device is biased to exhibit said other conductive state in response to an edge transition of said horizontal reference pulse occurring at the end of the horizontal reference pulse interval.

4. Apparatus according to claims 2 or 3, wherein:
said active device comprises a transistor having an input electrode, an output electrode, and a common electrode coupled to a reference potential, said output and common electrodes defining a main current conduction path of said transistor; and
said transistor is biased to exhibit a saturated conductive state under quiescent conditions, whereby the potential at said output electrode of said transistor closely approaches the potential at said common electrode and thereby closely approaches said reference potential.

5. Apparatus according to claim 4, wherein:
said translating means comprises a voltage divider network coupled between said common point and said output electrode of said transistor, whereby said voltage divider is coupled between said common point and said reference potential via said main current conduction path of said transistor when said transistor operates under quiescent conditions, to thereby establish a desired level for said clipped signals corresponding to said desired magnitude of said first pulse of said composite keying signal.

6. Apparatus according to claim 5, wherein:
said combining means is coupled to said voltage divider.

7. Apparatus according to claim 1, wherein said keying means comprises:
an active semiconductor current conducting device having an input electrode for receiving said horizontal reference pulse, and output and common electrodes, said active device being biased to conduct under quiescent conditions; and
signal processing means for coupling said horizontal reference pulse to said input electrode for producing a translated horizontal reference pulse at said input electrode, said translated pulse exhibiting in response to an edge transition of said horizontal reference pulse occurring at the end of the horizontal reference pulse interval an amplitude transition of a sense and magnitude sufficient to render said active device nonconductive for a duration determined by said signal processing means, to thereby produce said gate pulse at said output electrode, said gate pulse being delayed relative to said horizontal reference pulse and encompassing said burst interval.

8. Apparatus according to claim 7, wherein:
said signal processing means comprises a signal differentiating circuit.

9. Apparatus according to claim 8, wherein:
said active device comprises a transistor having an input electrode, an output electrode, and a common electrode coupled to a point of reference potential, said output and common electrodes defining a main current conduction path of said transistor;

said transistor is biased to exhibit a saturated conductive state under quiescent conditions, whereby the potential at said output electrode of said transistor closely approaches the potential at said common electrode and thereby closely approaches said reference potential;

and said translating means comprises a voltage divider network coupled between said common point and said output electrode of said transistor, whereby said voltage divider is coupled between said common point and said reference potential via said main current conduction path of said transistor when said transistor operates under quiescent conditions, to thereby establish a desired level for said clipped signals corresponding to said desired magnitude of said first pulse of said composite keying signal.

* * * * *